(12) United States Patent
Ueno (10) Patent No.: US 6,170,750 B1
(45) Date of Patent: Jan. 9, 2001

(54) READING AID MEMBER HAVING CODE PATTERN AND CODE PATTERN READING AID MEMBER

(75) Inventor: Fuminori Ueno, Hachioji (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/196,028

(22) Filed: Nov. 19, 1998

(30) Foreign Application Priority Data

Nov. 27, 1997 (JP) ..................................................... 9-325969

(51) Int. Cl.[7] ...................................................... G06K 7/10
(52) U.S. Cl. ......................................... 235/462.1; 434/112
(58) Field of Search ........................... 235/462.1, 462.08, 235/462.09, 462.45, 462.49; 434/112, 113, 114, 116, 117, 313

(56) References Cited

U.S. PATENT DOCUMENTS

| | | | |
|---|---|---|---|
| 3,816,943 | * 6/1974 | Henry | 434/117 |
| 3,859,632 | * 1/1975 | Etter | 235/462.45 |
| 4,337,375 | * 6/1982 | Freeman | 235/462.01 |

* cited by examiner

Primary Examiner—Thien M. Le
Assistant Examiner—Larry D Taylor
(74) Attorney, Agent, or Firm—Frishauf, Holtz, Goodman, Langer & Chick, P.C.

(57) ABSTRACT

A reading aid member is formed by fixedly overlaying on a hard substrate a scan guiding plate-like member having substantially the same shape as that of the hard substrate with use of adhesive or the like. The hard substrate has a code pattern recording face on one side, on which two-dimensional code patterns (dot code patterns) are printed so as to be optically read. The scan guiding plate-like member has windows formed at positions corresponding to the printed positions of the code patterns. In reading a code pattern, the distal end portion of a pen-like reading apparatus is positioned in a window. By manually moving the reading apparatus along the window, the reading apparatus can be moved without meandering on the code pattern.

19 Claims, 9 Drawing Sheets

READING AID MEMBER HAVING CODE PATTERN AND CODE PATTERN READING AID MEMBER

BACKGROUND OF THE INVENTION

This invention relates to a reading aid member having a code pattern which enables a user to easily and comfortably read the code pattern with use of a reading apparatus from a code pattern recording face on which data including at least one of audio data, video data, and digital code data is printed as an optically readable two-dimensional code pattern. The present invention also relates to a code pattern reading aid member containing a code pattern recording medium on which data including at least one of audio data, video data, and digital code data is printed as an optically readable two-dimensional code pattern such that a user can easily and comfortably read a code pattern with use of a reading apparatus from a code pattern recording face of a code pattern recording medium.

In recent years, various contrivances and proposals have been made such that a physically handicapped person such as the visually handicapped can live a friendly, convenient, and comfortable life. The assignee of the present invention has researched and developed various products suitable for providing information to handicapped persons in order to meet such needs.

In order to provide predetermined information to the visually handicapped person, the information presented by audio data is proposed at first. As a tool for giving the information using audio data, there has been provided a tool using the conventionally known compact cassette tape for recording/reproducing audio data. The audio cassette tape, however, has been increasing in size, similarly to the apparatus for reproducing the data from it. Further, the unit cost of the tape as the medium is not negligibly small. In addition, a handicapped person cannot easily deal with the audio tape and the reproducing apparatus. As described above, the conventional tool using audio data needs to be improved in various points. The same may be said of an IC memory card, the applicability of which has been beginning to be enhanced in recent years.

In the meantime, the assignee of the present invention has invented a dot code as a two-dimensional code pattern for printing audio data on a printing medium such as paper in an optically readable form, and a code reading apparatus for reproducing information such as original audio information by manually scanning the dot code to optically read it, as proposed in U.S. Ser. No. 08/407,018.

Figure 1:
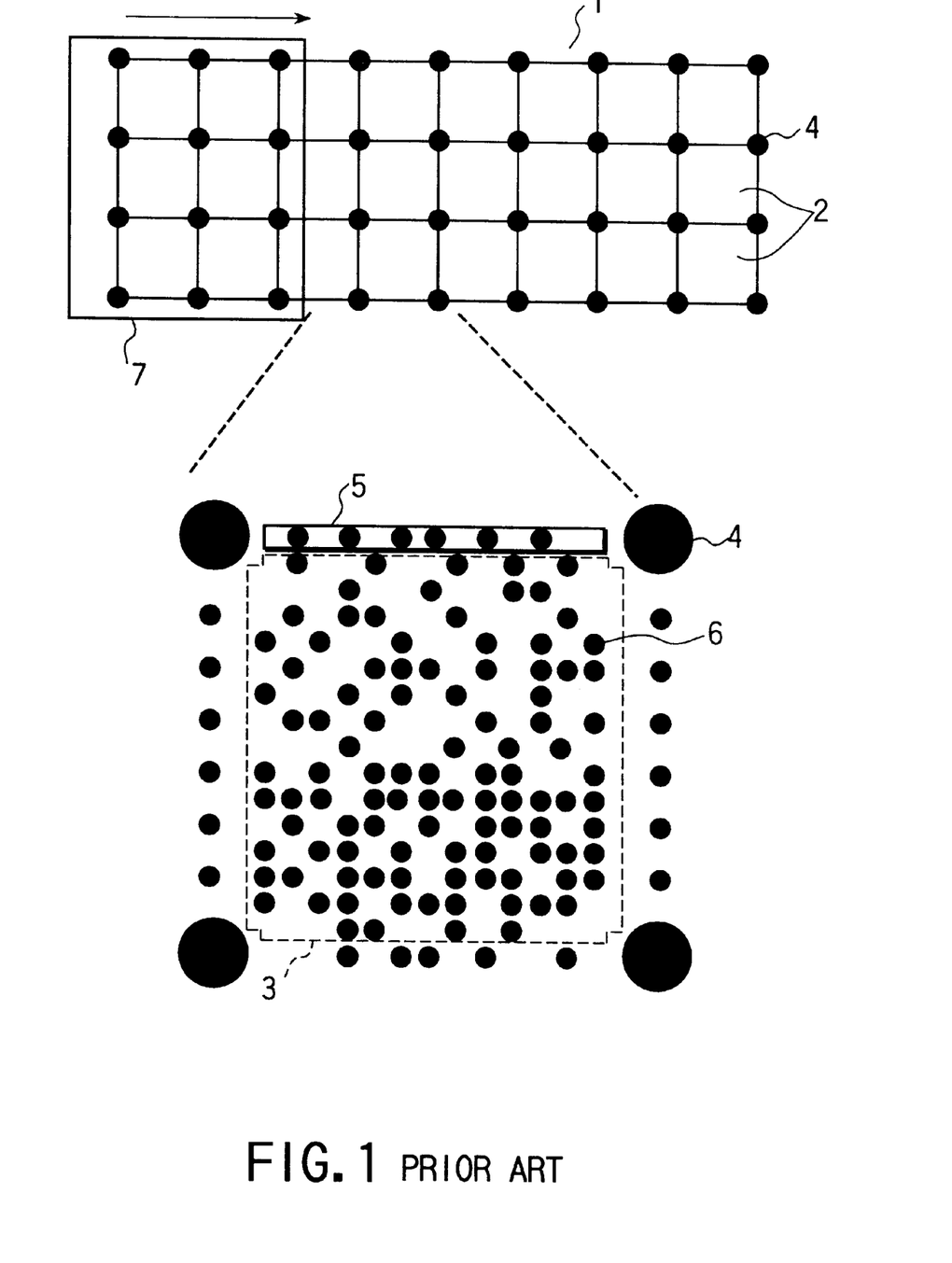
FIG. 1 shows the physical format structure of a dot code as a two-dimensional code pattern.

FIG. 1 shows the physical format of the dot code.

More specifically, a code pattern 1 of a dot code comprises a plurality of blocks 2 arranged two-dimensionally adjacent to each other. Each of the blocks 2 comprises a data area 3, markers 4, and block address patterns 5. In the data area 3, the audio data is represented as a dot image comprises a collection of white or black dots which correspond to "0" or "1" (the white dots have the same color as that of the background, and thus are not present in the block in FIG. 1) and arranged in a predetermined form. The markers 4 are used to find reference points for detecting dots 6 in the data area 3. The markers 4 comprise a predetermined number of serial black dots, and each is arranged at a respective corner of the block 2. The block address patterns 5 are arranged between the markers 4 so that the plurality of different blocks 2 can be discriminated in reading. The block address patterns 5 each include an error detection or error correction signal.

Accordingly, with use of the dot code having the physical format as mentioned above, the original data can be reconstructed by collecting the data of each block on the basis of the address when the address given to the each block can be identified, even if an imaging area 7 of a reading apparatus shown in FIG. 1 is smaller than the area of the entire dot code. In other words, even if the dot code cannot be read in one-shot by the solid-state imaging element such as a CCD of the reading apparatus, the data can be reconstructed. As a result, various uses of the printed audio data, which cannot be realized with use of the conventional technique, can be expected: a large amount data recording on a sheet or the like can be realized, which cannot have been realized with use of the conventionally known one-dimensional or two-dimensional bar code; and the transmission of the audio information can be easily and economically attained using paper as a medium.

In view of the above-mentioned circumstances, the inventor of the present invention has thought that the recording method using a medium such as paper on which audio information is recorded as an optically readable code pattern (like the dot code pattern and the reproducing apparatus proposed in the U.S. Ser. No. 08/407,018) is preferable to that using the compact cassette tape or an IC memory card, in synthetic consideration of the capacity for recording information, the merit in cost in printing the code pattern, and the handiness in reproducing the information. Particularly, as a tool to be used for providing information to a handicapped person, it was determined to be optimal.

However, the following improvements need to be performed for a visually handicapped person, for example, to manually and easily read the printed code pattern without any difficulty or any help:

Firstly, the position at which the printed code pattern is arranged must be precisely recognized. Secondly, a reading apparatus must be correctly moved on the recognized code pattern without meandering to read the printed dot code pattern correctly.

It can be said, therefore, that the above described code pattern cannot prove its merit for handicapped person until the above-mentioned problems are solved.

BRIEF SUMMARY OF THE INVENTION

The present invention has been developed to solve the above-mentioned problems, and intended to provide a reading aid member having a code pattern, which enables a user, particularly, a physically handicapped person, a little child, or the like, to always easily and comfortably read the code pattern by scanning the code pattern on which data including at least one of audio data, video data, and digital code data is printed as an optically readable code pattern on the printed code pattern recording face.

The present invention is also intended to provide a code pattern reading aid member which contains a code pattern recording medium on which data including at least one of audio data, video data, and digital code data is printed as an optically readable code pattern, and enables the user, particularly, the physically handicapped person, a little child, or the like, to always easily and comfortably reads the information by scanning the code pattern to correctly read from the code pattern recording face of the contained code pattern recording medium.

According to an aspect of the present invention, there is provided a reading aid member having a code pattern, comprising: a hard substrate having a printed code pattern recording face as a two-dimensional code pattern from which data including at least one of audio data, video data, and digital code data can be optically read; and a scan guiding plate-like member fixedly arranged on the code pattern recording face of the hard substrate, the scan guiding plate-like member being provided with a window having a shape corresponding to a shape of the two-dimensional code pattern and formed at a position corresponding to a printed position of the two-dimensional code pattern, the window serving as a guide in optical reading the data from the two-dimensional code pattern by manually scanning the two-dimensional code pattern with use of a code pattern reading apparatus to which the reading aid member is applied.

According to another aspect of the present invention, there is provided a code pattern reading aid member comprising:

a recording medium container for removably containing a code pattern recording medium having at a predetermined position a printed code pattern recording face as a two-dimensional code pattern from which data including at least one of audio data, video data and digital code data can be optically read;

an opening through which the recording medium is input/output into/from the recording medium container; and a window formed in a shape corresponding to that of the two-dimensional code pattern at a position corresponding to a predetermined position of the two-dimensional code pattern, the window serving as a guide in optically reading data from the two-dimensional code pattern by manually scanning the two-dimensional code pattern while the code pattern recording medium is contained in the recording medium container.

Additional objects and advantages of the invention will be set forth in the description which follows, and in part will be obvious from the description, or may be learned by practice of the invention. The objects and advantages of the invention may be realized and obtained by means of the instrumentality and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Prior to the detailed description of the embodiments of the present invention, the code pattern and the code pattern reading apparatus used in the present invention will be described specifically.

As the most preferable example, a dot code as a code pattern and a dot code reading apparatus for optically reading the dot code, to reproduce the information such as audio data by manually scanning the dot code are proposed by the applicant of the present invention in U.S. Ser. No. 08/407,018.

Figure 2:
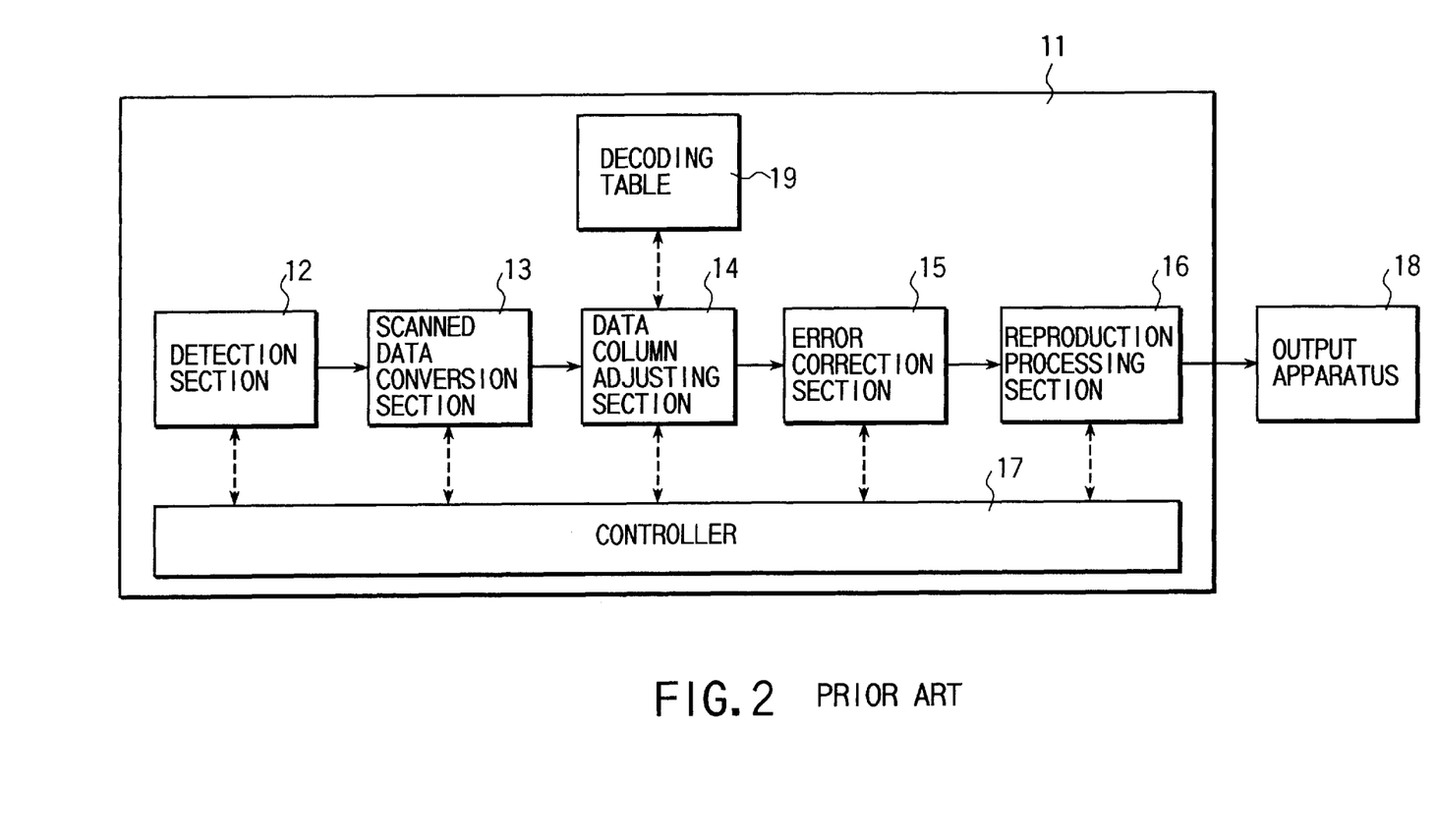
FIG. 2 is a block diagram of a reading apparatus to which the present invention is applied.

The dot code disclosed in U.S. Ser. No. 08/407,018 has been described with reference to FIG. 1. The dot code reading apparatus is shown in FIG. 2. FIG. 2 is a block diagram of the dot code reading apparatus for optically reading the dot code by manually scanning the dot code.

The dot code reading apparatus comprises: a detection section 12 including a solid-state imaging element such as a CCD for imaging the dot code; a scanned data conversion section 13 for recognizing the image data supplied from the detection section 12 as dot code image, normalizing the dot code image, and then outputting data of "1" or "0" corresponding to the white dots or black dots, which is obtained by converting the dot code image; a data column adjusting section 14 for adjusting columns of the data output from the scanned data conversion section 13 and decoding the data with reference to a decoding table 19; an error correction section 15 for correcting reading error or data error in reproducing the data output from the data column adjusting section 14; a reproduction processing section 16 for executing such a processing as extension of data output from the error correction section 15 (when the recorded original data such as audio data is compressed); and a controller 17 comprising of a microprocessor and the like for controlling each of the components and the entire apparatus. The audio data processed by the reproduction processing section 16 is output from an output apparatus 18 such as a speaker.

The dot code reading operation will be described next.

The dot codes 1 are sequentially imaged by contacting the detection section 12 (an opening for dot code reading) of the reading apparatus 11 to the dot code 1 and manually moving the reading apparatus 11 in a direction indicated by an arrow shown in FIG. 1. Even if the detection section 12 has only an imaging area equivalent to a part of the dot code, the reading apparatus can be used if the entire area of the dot code can be imaged by moving the reading apparatus for several times. In order to output the data of "0" or "1" obtained by detecting the dots by manually moving the reading apparatus in this manner, the markers 4 at corners of each block are detected from the plurality of frames of images at first. The precise barycenter of each of the markers 4 to determine them as reading reference points for reading the dots 6 desired to be read in the data area 3. Then, a predetermined X-Y coordinate system based on format information as the known information is applied to the rectangular region enclosed by the four reading reference points. The dots 6 in the block are read with use of pixel values of crossing points as reading points for reading the dots 6 in the X-Y coordinate system. The markers 4 are larger than the dots, and thus the detection of the markers 4 is performed using this feature.

The embodiments of the present invention will be described below with reference to the drawings.

[First embodiment]

Figures 3A, 3D:
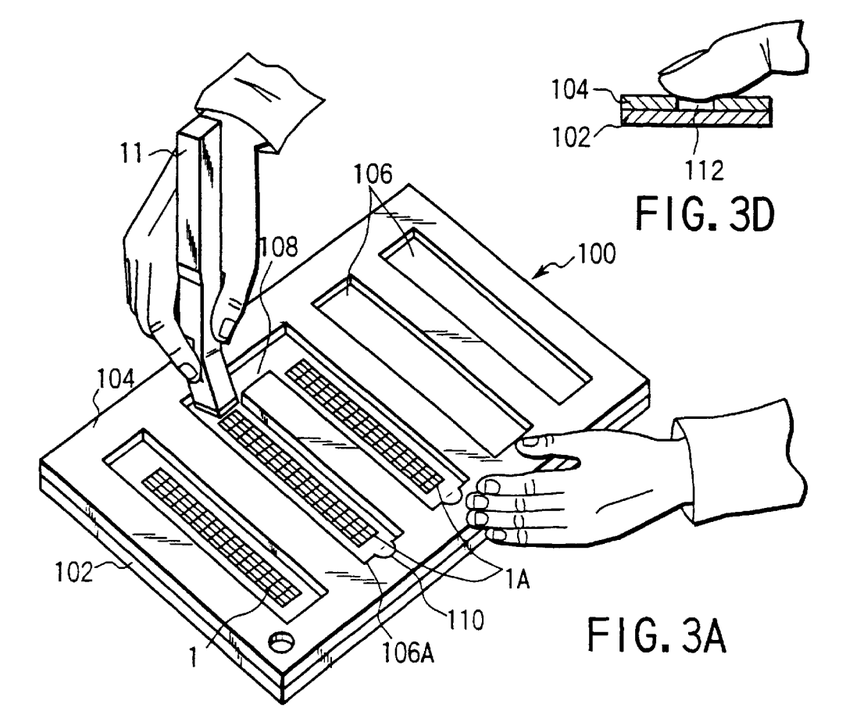
FIGS. 3A and 3B are a perspective view and a plain view of the reading aid member according to the first embodiment of the present invention, respectively.
FIGS. 3C and 3D are a sectional view taken along a line 3C—3C indicated by arrows in FIG. 3B and a sectional view taken along a line 3D—3D indicated by arrows in FIG. 3B, respectively.
Figure 3B:
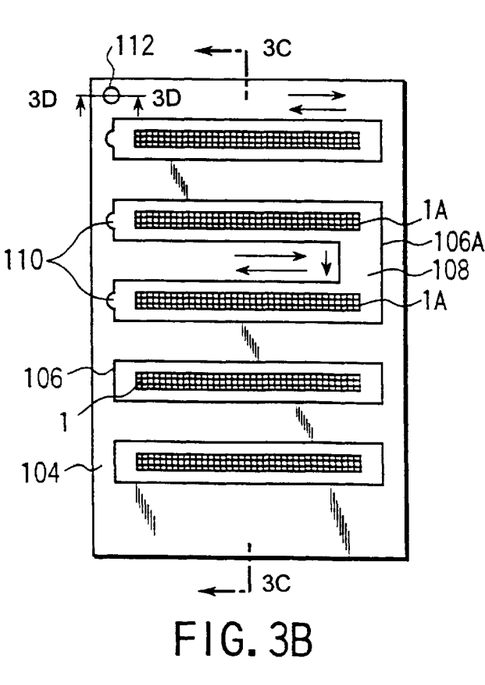
Figure 3C:
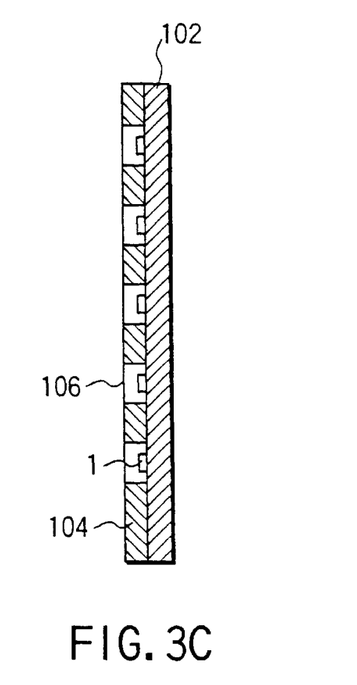

FIG. 3A is a perspective view of a reading aid member 100 according to the first embodiment of the present invention. FIG. 3B is the plain view thereof, and FIG. 3C is a sectional view of the reading aid member 100 taken along a line 3C—3C indicated by an arrow in FIG. 3B.

The reading aid member 100 comprises a hard substrate 102 formed of resin such as acrylic resin, a thick paper, or a metal such as aluminum; and a scan guiding plate-like member 104 formed of resin such as acrylic resin, a thick paper, or a metal such as aluminum, which has the substantially the same shape as that of the hard substrate 102 and is overlaid on the hard substrate 102 fixedly with use of adhesive or the like. The hard substrate 102 has a printed code pattern recording face on one side such that two-dimensional code patterns (dot code patterns) 1 can be optically read as shown in FIG. 1. The scan guiding plate-like member 104 is provided with windows 106 formed at positions corresponding to the printed positions of the code patterns 1.

Figure 4:
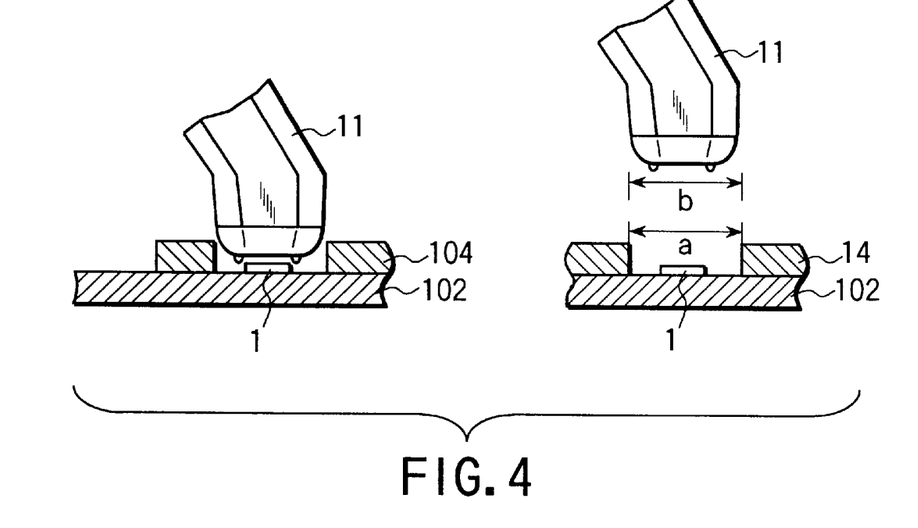
FIG. 4 is a sectional view showing the positional relationship between the reading aid member according to the first embodiment and a reading apparatus.

With this structure, a distal end of a pen-like reading apparatus 11 is positioned in one of the windows 106, and thus the reading apparatus 11 can move on the code pattern 1 in the window without meandering when the reading apparatus 11 is manually moved along the window 106, to correctly read the code pattern 1. More specifically, joggling or rolling of the reading apparatus 11 due to the shaking of the hand in manual scanning can be prevented by setting the length a of the windows 106 of the scan guiding plate-like member 104 to be substantially equal to the length b of the distal end portion as a code scanning face of the reading apparatus 11 as shown in FIG. 4. It is important for attaining good scanning performance to set the length b is a little smaller than the length a to obtain a suitable clearance.

Without the scan guiding plate-like member 104 having the above-mentioned structure, the user must be very careful in manually scanning the code pattern 1 such that the reading apparatus 11 does not deviate from the code pattern 1. Such an apparatus is very difficult to use for a user such as a little child, an aged person, or a handicapped person.

It is not limited to a user such as a little child, an aged person, or the like. It is very difficult even for a non-handicapped person to find and correctly scan the code pattern 1 in a dark place such as a concert hall, a movie theater, car or train in the evening, or airplane, and thus the user must work hard to scan the code pattern.

According to the present embodiment, the reading aid member is provided with the scan guiding plate-like member 104. The user thus does not need find the code pattern 1 at first. Once the user detects the window 106 and moves the reading apparatus 11 along the window 106, the window 106 corrects the joggling or deviating of the reading apparatus 11, and thus the reading apparatus 11 correctly moves on the code pattern 1. With such a structure, anyone can read the code pattern 1 without difficulty in any place.

The windows for a serial code 1A which is constituted of a plurality of the code patterns 1 each representing data to be synthesized by being serially scanning the plurality of code patterns 1 to reconstruct one piece of recognizable data are provided with a linking portion 108 for linking the plurality of windows of the code patterns in order to form the windows as a serial window 106A. By forming the windows such as a serial window 106A, the reading apparatus 11 can scan the code pattern 1 serially without leaving the reading apparatus 11 from the code pattern recording face once. In this manner, the code pattern having a large amount of information can be suitably read, and the operability is not lowered.

In order to discriminate the window 106, which has one row, from the serial window 106A, which has a plurality of rows, it is preferable to provide a serial window discriminating convexo/concave portion 110 to the distal end portion of the serial window. 106A, as shown in FIG. 3B. By forming such a portion, even a user such as a visually handicapped person can discriminate the type of the window tactilely by touching the serial window discriminating convexo/concave portion 110.

Further, the direction of the reading aid member 100 can be easily detected by providing a direction detecting convexo/concave portion 112 at a predetermined portion (upper left, for example) of the scan guiding plate-like member 104, as shown in FIG. 3B, and by informing in advance that the direction detecting convexo/concave portion 112 is constantly positioned at the upper left position, for example. More specifically, by forming the direction detecting convexo/concave portion 112 in a shape so as to be recognizable tactilely by a finger as shown in FIG. 3D as a sectional view of the reading aid member taken along the line 3D—3D indicated by arrows, the direction of the reading aid member can be detected to ease the operation even in the darkness or even for a visually handicapped person.

Figure 5:
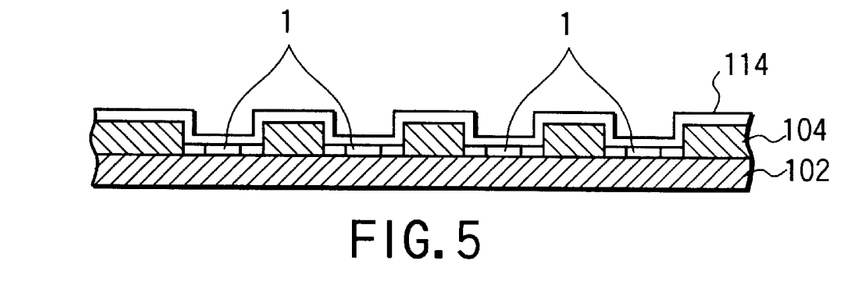
FIG. 5 is a sectional view of the modification of the reading aid member according to the first embodiment.

As shown in FIG. 5, the code pattern 1 can be protected from dirt or scratches by covering the surface of the reading aid member 100, i.e., the surface of the scan guiding plate-like member 104 and the code pattern 1 with a resin film or a transparent sheet 114 formed of glass or the like. Particularly, excessive dirt or scratches of the code pattern 1 makes the data recorded on the code pattern not be reproduced, and thus the code pattern 1 is preferable to be covered with some material.

[Second embodiment]

The second embodiment of the present invention will be described next.

Figure 6:
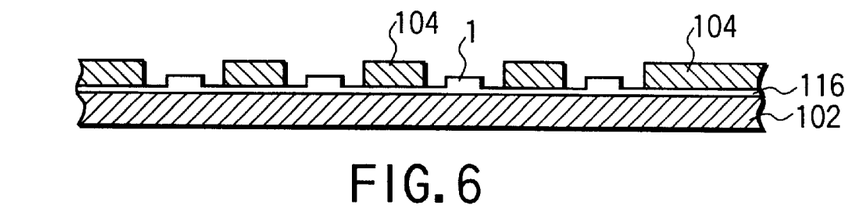
FIG. 6 is a sectional view of a reading aid member according to the second embodiment of the present invention.

In the first embodiment, the code pattern 1 is directly printed on the hard substrate 102. In the second embodiment, the code pattern recording face is formed of a member other than that of the hard substrate 102, i.e., a code pattern recording sheet 116, as shown in FIG. 6. The code pattern recording sheet 116 is be integrated with the scan guiding plate-like member 104.

Figure 7:
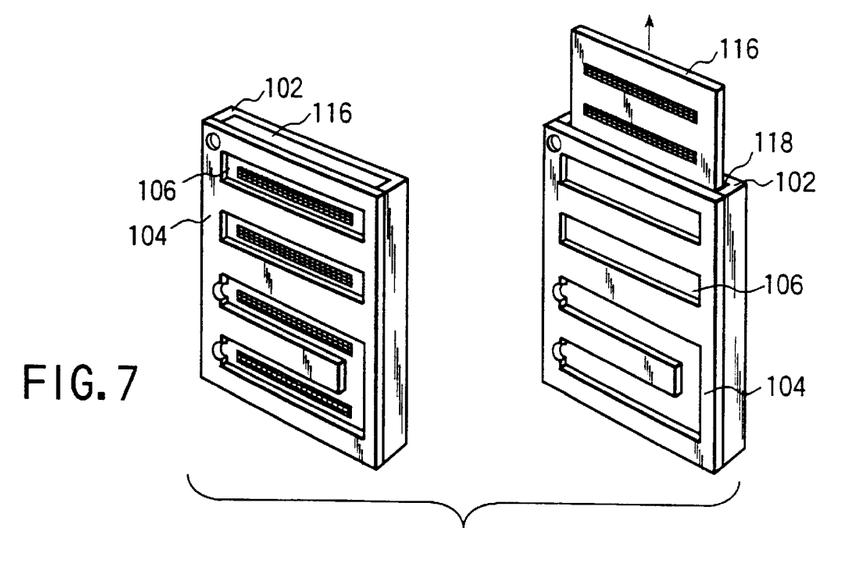
FIG. 7 is a perspective view of the modification of the reading aid member according to the second embodiment.

The code pattern recording face according to this embodiment may have the structure as shown in FIG. 7. A slit for the code pattern recording sheet 116 as a code pattern recording face is formed between the hard substrate 102 and the scan guiding plate-like member 104. The hard substrate 102 is formed to be integral with the scan guiding plate-like member 104, and the slit serves as a recording medium container. The slit has at the upper portion a sheet replacing opening 118 for replacing the code pattern recording sheet 116 with the other code pattern recording sheet to pick/insert the code pattern recording sheet 116 from/into the recording medium container.

According to the second embodiment as described above, the reading aid member can be used for various objects merely by replacing the code pattern recording sheet 116, thereby the applicability of the reading aid member is enhanced to increase the commercial value and the added values of the reading aid member.

[Third embodiment]

Next, the third embodiment of the present invention will be described below.

In the first and second embodiments, the code pattern face is provided to one side of the reading aid member 100. On the other hand, the reading aid member of the third embodiment is provided with the code pattern face on both front and rear sides.

Figure 8A:
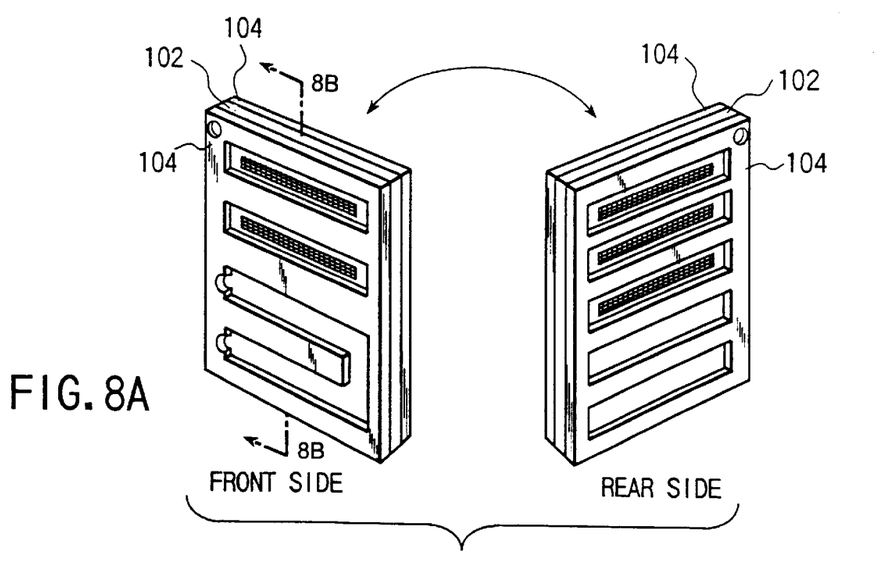
FIGS. 8A and 8B are a perspective view and a sectional view of a reading aid member according to the third embodiment of the present invention, respectively.
Figure 8B:
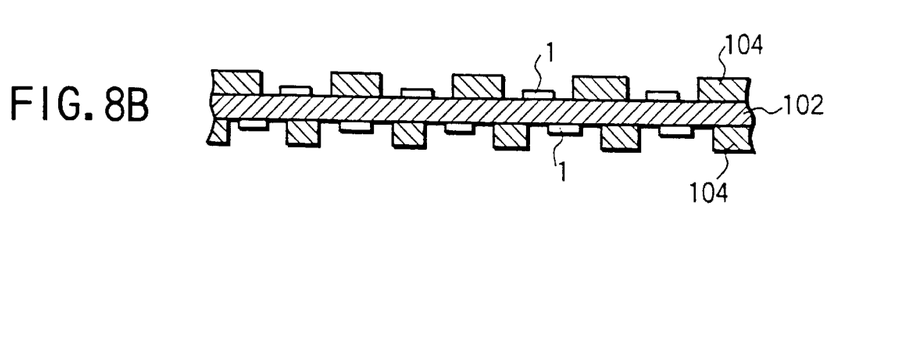

According to the present embodiment, the code pattern 1 is printed on the both sides of the hard substrate 102, as shown in FIGS. 8A and 8B. The both sides of the hard substrate 102 are each provided with the scan guiding plate-like member 104.

With such a structure, both the front and rear sides can be used respectively, and substantially the double of the information which can be recorded by the one-side recording, and thus a large amount of data can be recorded. In this manner, a better information providing tool can be attained in comparison with an IC memory card or a cassette tape.

Figure 9:
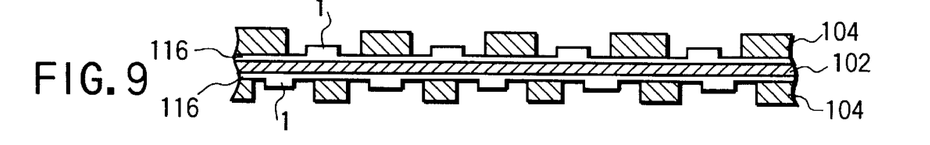
FIGS. 9, 10, 11, 12, and 13 respectively show the modifications of the reading aid member according to the third embodiment, respectively.

Further, similarly to the second embodiment, the code pattern recording face is formed as the code pattern recording sheet 116 to be separated from the hard substrate 102, and the code pattern recording sheet 116 as a code pattern recording face may be arranged on each of the front and rear sides, as shown in FIG. 9.

Figure 10:
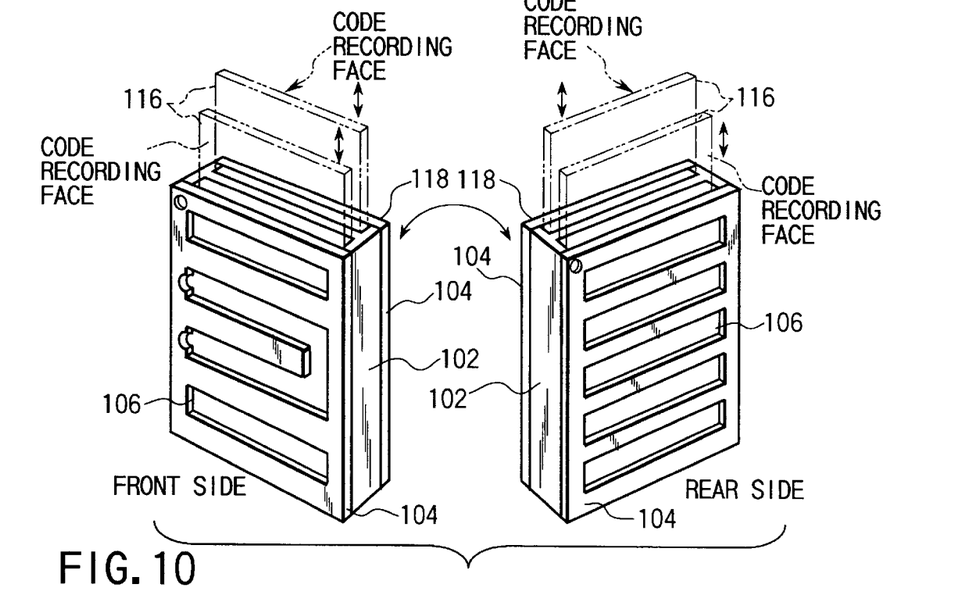

Further, as shown in FIG. 10, a slit is formed between the hard substrate 102 and the scan guiding plate-like members 104 on each of the sides for the code pattern recording sheet 116 so as to integrally form the hard substrate 102 and the scan guiding plate-like members 104. The reading aid member can be formed such that the code pattern recording sheet 116 can be freely input/output sheet replacing opening 118 for replacing the code pattern recording sheets 116 with the other code pattern recording sheet in the slit as a recording medium container for each of the code pattern recording sheets.

With this structure, the reading aid member can be used for various uses merely by replacing the code pattern recording sheet 116: for example, the apparatus can store the information in such a manner that information which can be fixedly located is inserted into the front side slit and the information to be frequently replaced is inserted into the rear side slit. In this manner, the applicability of the reading aid member is enhanced to increase the commercial value or the added value thereof, thereby the reading aid member can be used not only as a simple reading aid member but also one of the information providing tools which can be used in various application.

Figure 11:
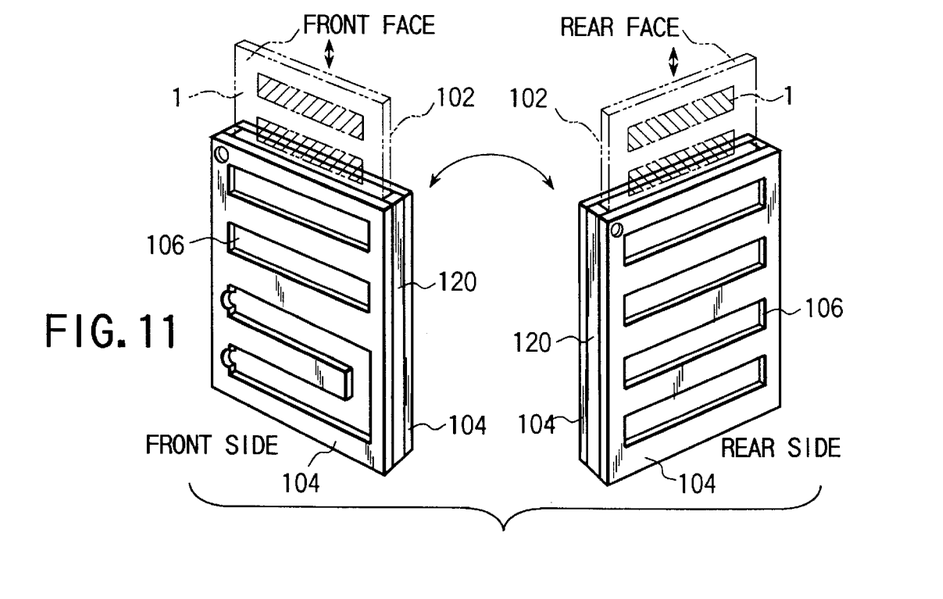

FIG. 11 shows the modification of the third embodiment, wherein two scan guiding plate-like substrates 104 are formed integrally by means of a slit 120 having a size corresponding to the thickness of the hard substrate 102. The code pattern recording face is provided to the both sides of the hard substrate 102, and the hard substrate 102 can be replaced in any time. With the above-mentioned structure, the user must not use the code pattern recording sheets 116 to be dealt with respectively on the front and rear sides. In addition, the hard substrate is one plate, and thus the number of components of the aid member can be reduced.

Figure 12:
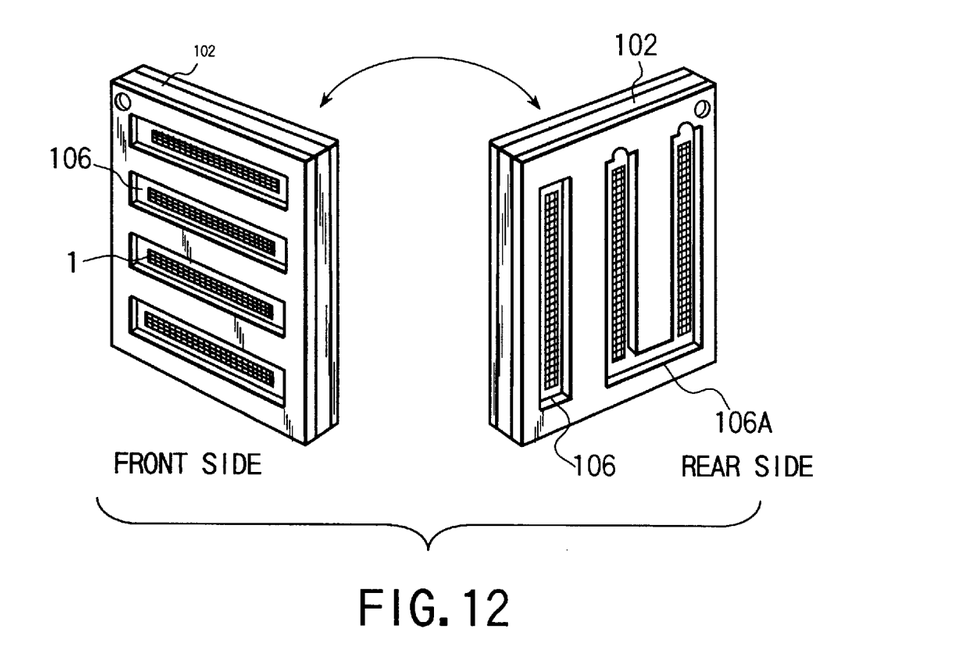

It goes without saying that the direction of the window 106 of the scan guiding plate-like member 104 on the front side and that of the window 106 of the scan guiding plate-like member 104 on the rear side, i.e., the recording direction of the code pattern 1, may cross each other in a longitudinal direction thereof as shown in FIG. 12. With such a structure, the strength of the reading aid member against both the vertical and horizontal bending forces increases to improve the strength of the reading aid member body. As a result, the thickness of the reading aid member can be reduced or the material of the reading aid member can be changed to a light medium such as paper, so that the weight of the member can be reduced.

Figure 13:
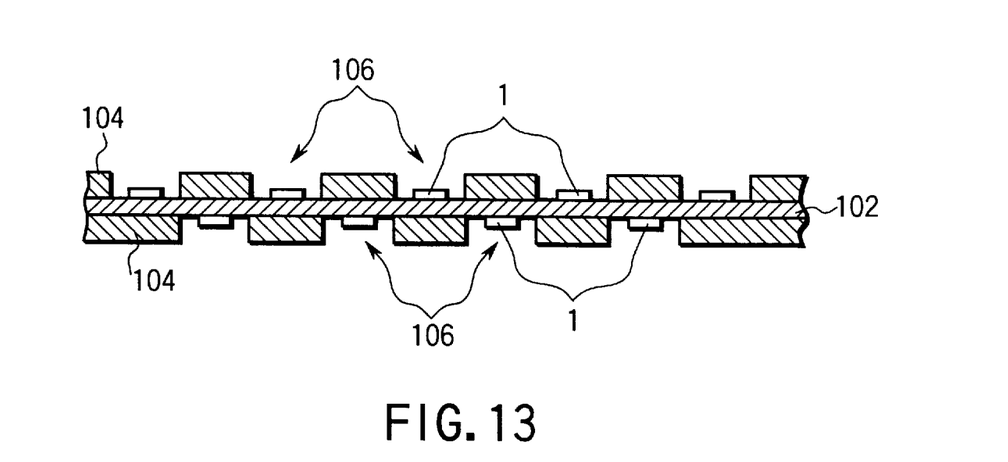

When the windows are formed in the same direction, the windows 106 on the front side and the window 106 on the rear side are formed so as to be located at different positions as shown in FIG. 13. By forming the windows in this manner, even if the hardness of the hard substrate 102 is a little lowered, the rear scan guiding plate-like member will compensate the lowered hardness, so that the scanning operations can be performed without problem.

[Fourth embodiment]

Figure 14:
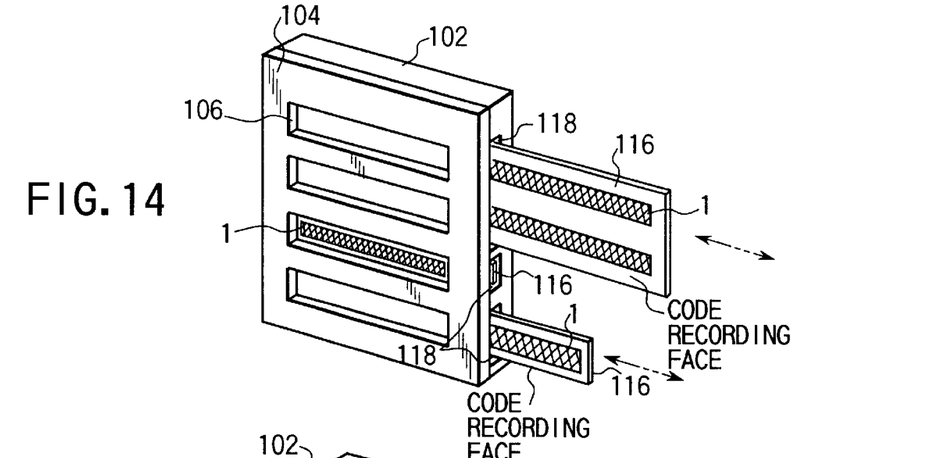
FIG. 14 is a perspective view of a reading aid member according to the fourth embodiment of the present invention.

FIG. 14 shows the fourth embodiment of the present invention, wherein the code pattern recording sheet 116 is input/output in a direction parallel to a longer side of each of the windows 106, and the code pattern recording sheet 116 comprises a plurality of sections. With this structure, when the third code pattern needs to be replaced, for example, only the third code pattern can be replaced without replacing the entire code pattern recording sheet 116. Accordingly, the code pattern to be replaced with the other code pattern can be easily replaced by detachably locating it on the code pattern recording sheet 116 in advance. By virtue of this structure, the applicability of the reading aid member is enhanced. Further, the code pattern recording face including the codes which need not to be replaced needs not to be newly prepared, and thus the period of time required for the changing the code pattern can be reduced.

Figure 15:
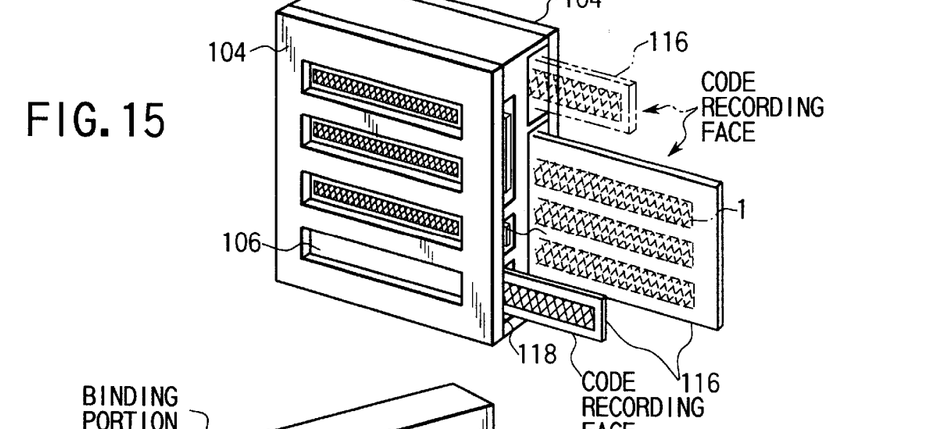
FIGS. 15 and 16 are perspective views of a modification of a reading aid member according to the fourth embodiment.
Figure 16:
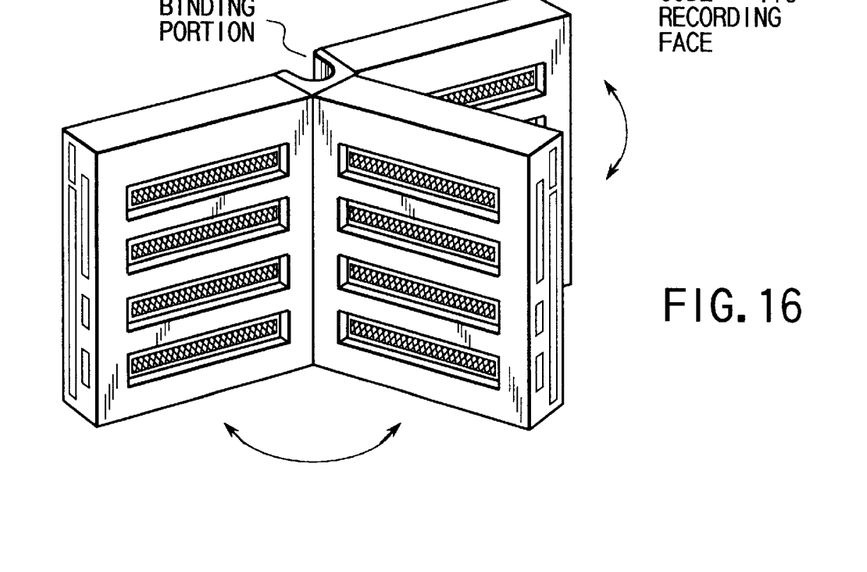

FIG. 15 shows the modification of the fourth embodiment, wherein a code pattern recording sheets 116 is provided to each sides of the hard substrate. The reading aid member shown in FIG. 16 comprises a plurality of the reading aid members shown in FIG. 15 by binding the members on one side thereof such that the members can be used like as a book. By constituting the members in this manner, the applicability of the member is enhanced.

[Fifth embodiment]

Figure 17:
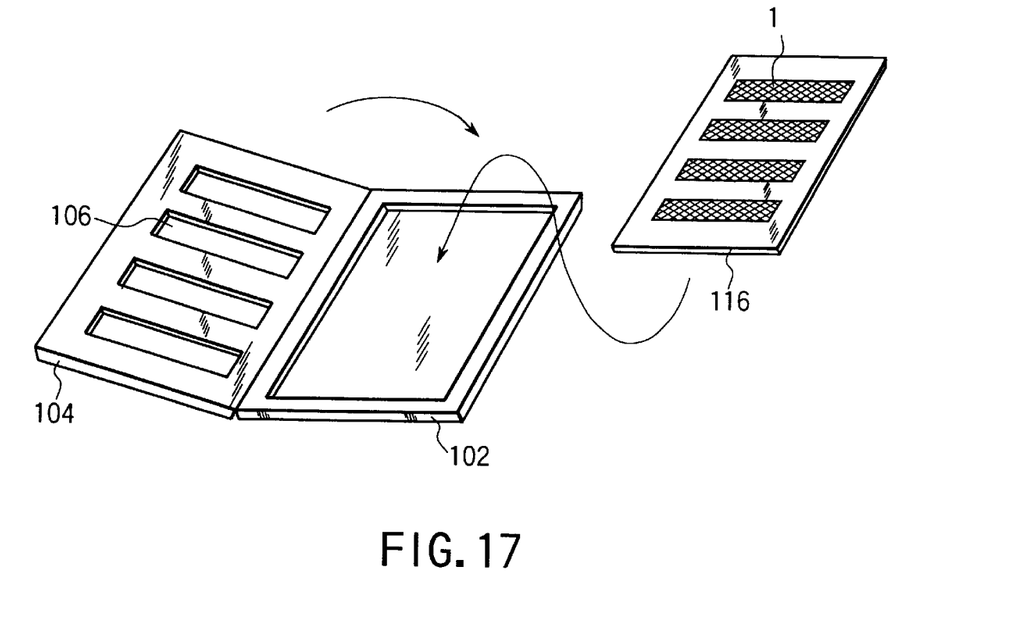
FIG. 17 is a perspective view of a reading aid member according to the fifth embodiment of the present invention.
Figure 18:
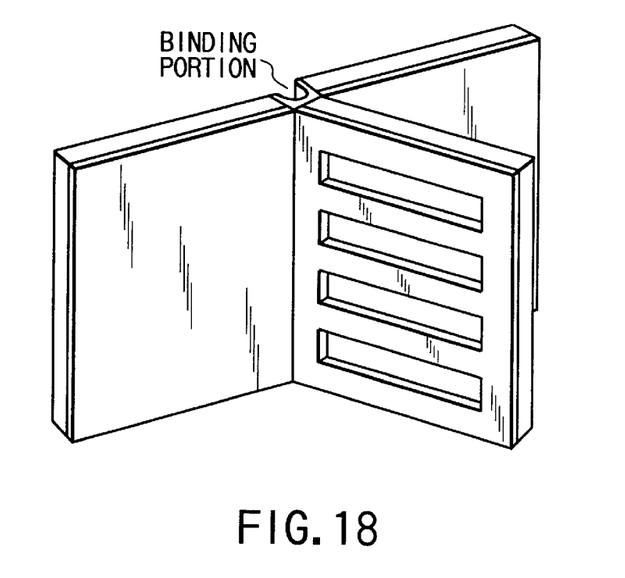
FIG. 18 is a perspective views of a modification of a reading aid member according to the fifth embodiment.

FIG. 17 shows the fifth embodiment of the present invention, wherein the hard structure 102 and the scan guiding plate-like member 104 are combined with each other on one side so as to open the member. The reading aid member having such a structure can be used by mounting the code pattern recording sheet 116 on the hard substrate 102, and covering it with the scan guiding plate-like member 104 to be stabilized thereon. With this method, even a little child can easily replace the code pattern recording sheet 116. If a plurality of members are bound on one side thereof as shown in FIG. 18, a large amount of information can be stored in one place.

The present invention has been described with reference to the above-mentioned embodiments. The present invention, however, is not limited to the above-mentioned embodiments, but various changes and modifications may be made in the present invention without departing from the spirit and scope thereof.

The features of the present inventions will be summed up, as follows:

(1) A reading aid member having a code pattern, comprising:

a hard substrate having a printed code pattern recording face as a two-dimensional code pattern from which data including at least one of audio data, video data, and digital code data can be optically read; and a scan guiding plate-like member fixedly arranged on the code pattern recording face of the hard substrate, the scan guiding plate-like member being provided with a window having a shape corresponding to a shape of the two-dimensional code pattern and formed at a position corresponding to a printed position of the two-dimensional code pattern, the window serving as a guide in optical reading the data from the two-dimensional code pattern by manually scanning the two-dimensional code pattern with use of a code pattern reading apparatus to which the reading aid member is applied.

According to this structure, particularly a physically handicapped person, a little child, or the like, or, a non-handicapped person in the darkness can always easily and comfortably scan and correctly read the code pattern from a printed code pattern recording face as a code pattern from which data including at least one of audio data, video data, and digital code data can be optically read.

(2) The reading aid member having the code pattern according to (1), wherein the scan guiding plate-like member has a first convexo/concave portion for tactilely detecting at least one of the vertical and horizontal directions of the two-dimensional code pattern on a surface thereof.

In addition to the effect described in (1), according to (2), a physically handicapped person or a non-handicapped person in the darkness can easily discriminate which direction the code pattern recording face is directed.

(3) The reading aid member having the code pattern according to (1), wherein when a plurality of two-dimensional code patterns are printed on the code pattern recording face, data obtained by serially reading the plurality of two-dimensional code patterns is synthesized to reconstruct one piece of data, windows formed corresponding to the two-dimensional code patterns to be synthesized are linked to each other by means of a linking portion through which the reading apparatus can pass while scanning the patterns.

In addition to the effect of (1), according to the above-mentioned structure of (3), the code pattern can be scanned continuously without leaving the reading apparatus from the code pattern recording face. With this structure, the code pattern having a large amount of information can be scanned, and the operability of the apparatus is improved.

(4) The reading aid member having the code pattern according to (3), wherein the windows are each provided at a near position thereto with a second convexo/concave portion for tactilely determining whether the two-dimensional code pattern corresponding to the window is a two-dimensional code pattern for reconstructing the one piece of data by the synthesis or a two-dimensional code pattern capable of reconstructing data by itself.

In addition to the effect of (3), according to this structure, a physically handicapped person or a non-handicapped person in the darkness can easily discriminate whether data can be reproduced only by the code pattern on the code pattern recording face or by synthesizing a plurality of the code patterns.

(5) The reading aid member having the code pattern according to (1), wherein the window is covered with a transparent sheet such that the reading apparatus can optically read the two-dimensional code pattern during manually scanning it.

In addition to the effect of (1), according to the structure of (5), the code pattern on the code pattern recording face can be protected from dirt and scratches, and thus the member and the apparatus can be used outdoors.

(6) The reading aid member having the code pattern according to (1), wherein a length of the window in a direction crossing the scanning direction of the reading apparatus is set substantially equal to that of a distal end portion of the reading apparatus in the same direction.

In addition to the effect of (1), according to the structure of (6), the joggling or rotation of the reading apparatus due to the shaking during the manual scanning can be prevented, and thus the reading reliability can be improved.

(7) The reading aid member having the code pattern according to (1), wherein the code pattern recording face is formed of different material from that of the hard substrate.

In addition to the effect of (1), according to the structure of (7), the code pattern printed on a paper or the like can be adhered on the hard substrate, and thus the material of the hard substrate is not limited to a particular one suitable for the printing, and thus even material unsuitable for fine printing can be used to form the hard substrate.

(8) The reading aid member having the code pattern according to (7), further comprising a sheet replacing opening for replacing the code pattern recording face with the other code pattern recording face.

In addition to the effect of (7), according to the structure of (8), code patterns recording data thereon can be replacably used in accordance with the objects, and thus the applicability of the apparatus can be enhanced.

(9) The reading aid member having the code pattern according to (1), wherein the hard substrate has the code pattern recording face on both sides, and the scan guiding plate-like member is respectively provided to the code pattern recording face arranged on the both sides of the hard substrate.

In addition to the effect of (7), according to the structure of (9), the recording capacity of the code pattern can be increased and the applicability of the recording aid member can be used can be enhanced.

(10) The reading aid member having the code pattern according to (9), wherein each of the code pattern recording face is formed of different material from that of the hard substrate.

In addition to the effect of (9), according to the structure of (10), the code pattern printed on a paper or the like can be adhered on the hard substrate, and thus the material of the hard substrate is not limited to a particular one suitable for the printing, and thus even material unsuitable for fine printing can be used to form the hard substrate.

(11) The reading aid member having the code pattern according to (10), further comprising a sheet replacing opening for replacing the code pattern recording face with the other code pattern recording face.

In addition to the effect of (10), according to the structure of (11), various types of code patterns can be replacably used in accordance with the objects, and thud the applicability of the apparatus can be enhanced.

(12) The reading aid member having the code pattern according to (9), wherein the two-dimensional code pattern is printed on the code pattern recording faces such that the windows of the scan guiding plate-like member arranged on one side of the hard substrate and the windows of the scan guiding plate-like member arranged on the other side different from the one side cross each other in a longitudinal direction thereof.

In addition to the effect of (9), according to the structure of (12), the strength of the reading aid member body against both the vertical and horizontal bending forces is increased, to strengthen the reading aid member body. With this structure, the thickness of the reading aid member body can be reduced, or the material for the reading aid member body can be changed to such light material as a paper, to reduce the weight of the reading aid member.

(13) The reading aid member having the code pattern according to (9), wherein the two-dimensional code pattern is printed on each of the code pattern recording faces such that the windows of the scan guiding plate-like member arranged on the one side of the hard substrate and the windows of the scan guiding plate-like member arranged on the other side different from the one of the sides are formed at different positions from each other.

In addition to the effect of (9), according to the structure of (13), even if the hardness of the hard substrate is a little lowered, the scan guiding plate-like member on the rear side will support the member on the front side, and thus the scanning operations can be performed without problem.

(14) A code pattern reading aid member comprising:
  a recording medium container for removably containing a code pattern recording medium having at a predetermined position a printed code pattern recording face as a two-dimensional code pattern from which data including at least one of audio data, video data and digital code data can be optically read;
  an opening through which the recording medium is input/output into/from the recording medium container; and
  a window formed in a shape corresponding to that of the two-dimensional code pattern at a position corresponding to a predetermined position of the two-dimensional code pattern, the window serving as a guide in optically reading data from the two-dimensional code pattern by manually scanning the two-dimensional code pattern while the code pattern recording medium is contained in the recording medium container.

According to this structure, particularly a physically handicapped person, a little child, or the like, or a non-handicapped person in the darkness can always easily and comfortably scan a printed code pattern recording face as a code pattern from which data including at least one of audio data, video data, and digital code data can be optically read, and correctly read it.

(15) The code pattern reading aid member according to (14), wherein
  the recording medium container has a slit for containing the code pattern recording medium between a hard substrate and a scan guiding plate-like member to integrally form the hard substrate and the scan guiding plate-like member, and
  the scan guiding plate-like member has on the surface thereof the window and a first convexo/concave portion for tactilely detecting at least one of vertical and horizontal directions in which the two-dimensional code pattern is directed.

In addition to the effect of (14), according to this structure, a physically handicapped person or a non-handicapped person in the darkness can easily detect in which one of the vertical and horizontal directions the code pattern recording face is directed.

(16) The code pattern reading aid member according to (14), wherein
  when a plurality of two-dimensional code patterns are printed on the code pattern recording face, data obtained by serially reading the plurality of two-dimensional code patterns is synthesized to reconstruct one piece of data, windows formed corresponding to the two-dimensional code patterns to be synthesized are linked to each other by means of a linking portion through which the reading apparatus can pass while scanning the patterns.

In addition to the effect of (14), according to the above-mentioned structure of (16), the code pattern can be scanned continuously without leaving the reading apparatus from the code pattern recording face. With this structure, the code pattern having a large amount of information can be scanned, and the operability of the apparatus is improved.

(17) The code pattern reading aid member according to (16), wherein the windows are each provided at a position near thereto with a second convexo/concave portion for tactilely determining whether the two-dimensional code pattern corresponding to the window is a two-dimensional code pattern for reconstructing the one piece of data by the synthesis or a two-dimensional code pattern capable of reconstructing data by itself.

In addition to the effect of (16), according to this structure, a physically handicapped person or a non-handicapped person in the darkness can easily discriminate whether data can be reproduced only from the code pattern on the code pattern recording face or by synthesizing a plurality of the code patterns.

(18) The code pattern reading aid member according to (14), wherein a length of the window in a direction crossing the scanning direction of the reading apparatus is set substantially equal to that of a distal end portion of the reading apparatus in the same direction.

In addition to the effect of (14), according to the structure of (18), the joggling or rotation of the reading apparatus due to the shaking during the manual scanning can be prevented, and thus the reading reliability can be improved.

(19) The code pattern reading aid member according to (14), wherein the recording medium container is formed by integrating the hard substrate and the scan guiding plate-like members in such a manner that slits for containing the code pattern recording medium are formed between the hard substrate and the scan guiding plate-like members on the front and rear sides, and the hard substrate is held by the two scan guiding plate-like members therebetween,
  the sheet replacing opening is formed to correspond to each of the slits, and
  the window is provided to each of the scan guiding plate-like members on the front and rear sides.

In addition to the effect of (14), according to this structure of (19), the recording capacity of the code pattern can be increased to enhance the use of the aid member.

(20) The code pattern reading aid member according to (19), wherein the windows formed in one of the two scan guiding plate-like members and the windows formed in another one of the two scan guiding plate-like members cross each other in a longitudinal direction thereof.

In addition to the effect of (19), according to this structure, the strength of the reading aid member against the bending forces both in vertical and horizontal directions is increased, so that the code pattern reading aid member body is strengthened. With this structure, the thickness of the reading aid member body can be reduced or formed of light material such as a paper, so that the weight of the reading aid member body can be reduced.

(21) The code pattern reading aid member according to (14), wherein the recording medium container comprises two scan guiding plate-like substrates integrated by means of a spacer having a predetermined thickness, and the windows are provided to each of the two scan guiding plate-like members.

In addition to the effect of (14), according to this structure, the recording capacity of the code pattern can be increased to enhance the applicability of the aid member.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A reading aid member comprising:

a hard substrate having a printed code pattern recording face on which a plurality of optically readable two-dimensional code patterns representing at least one of audio data, video data and digital code data are printed; and a scan guiding plate member fixedly arranged on the code pattern recording face of said hard substrate, said scan guiding plate member being provided with a plurality of windows, each having a shape corresponding to a shape of a respective one of the two-dimensional code patterns and formed at a position corresponding to a printed position of the respective one of the two-dimensional code patterns, wherein said windows serve as a guide for a reading apparatus for optically reading the two-dimensional code patterns by manually scanning the two-dimensional code patterns, and wherein at least two of said windows are linked to each other by a linking portion through which the reading apparatus can pass, such that the two-dimensional code patterns corresponding to said linked windows can be serially read and data obtained thereby can be synthesized to reconstruct one piece of data.

2. The reading aid member according to claim 1, wherein said scan guiding plate member includes a first convexo/concave portion on a surface thereof for enabling at least one of a vertical and a horizontal direction of the two-dimensional code patterns to be tactilely detected.

3. The reading aid member according to claim 1, wherein each of said windows is provided with a second convexo/concave portion proximal thereto for enabling tactile determination of whether or not said window is linked to another one of said windows.

4. The reading aid member according to claim 1, wherein each of said windows is covered with a transparent sheet.

5. The reading aid member according to claim 1, wherein a length of each of said windows in a direction crossing a scanning direction of the reading apparatus is set substantially equal to a length of a distal end portion of the reading apparatus in the direction crossing the scanning direction of the reading apparatus.

6. The reading aid member according to claim 1, wherein the code pattern recording face is formed of a different material than said hard substrate.

7. The reading aid member according to claim 6, further comprising a sheet replacing opening for replacing the code pattern recording face with another code pattern recording face.

8. The reading aid member according to claim 1, wherein said hard substrate has first and second sides, and first and second code pattern recording faces and first and second scan guide plate members are respectively provided on said first and second sides of said hard substrate.

9. The reading aid member according to claim 8, wherein each of the first and second code pattern recording faces is formed of different material than said hard substrate.

10. The reading aid member according to claim 9, wherein a sheet replacing opening is provided between at least one of said first and second sides of said hard substrate and one of said first and second scan guide plate members, respectively, for enabling replacement of one said code pattern recording face with another said code pattern recording face.

11. The reading aid member according to claim 8, wherein the two-dimensional code pattern printed on the first code pattern recording face and said windows of said first scan guiding plate are oriented in a direction longitudinally crossing a direction of orientation of the two-dimensional code pattern printed on the second code pattern recording face and said windows of said second scan guiding plate.

12. The reading aid member according to claim 8, wherein the two-dimensional code pattern printed on the first code pattern recording face and said windows of said first scan guiding plate are arranged at positions on the first side of said hard substrate which are different than positions at which the two-dimensional code pattern printed on the second code pattern recording face and said windows of said second scan guiding plate are arranged on the second side of said hard substrate.

13. A code pattern reading aid member comprising:

a recording medium container having an opening through which a code pattern recording medium can be removably inserted, said code pattern recording medium comprising a code pattern recording face on which a plurality of optically readable two-dimensional code patterns representing at least one of audio data, video data and digital code data are printed, wherein said recording medium container comprises a scan guiding plate member provided with a plurality of windows, each having a shape corresponding to a shape of a respective one of the two-dimensional code patterns and formed at a position corresponding to a printed position of the respective one of the two-dimensional code patterns, wherein said windows serve as a guide for a reading apparatus for optically reading the two-dimensional code patterns by manually scanning the two-dimensional code patterns, and wherein at least two of said windows are linked to each other by a linking portion through which the reading apparatus can pass, such that the two-dimensional code patterns corresponding to said linked windows can be serially read and data obtained thereby can be synthesized to reconstruct one piece of data.

14. The code pattern reading aid member according to claim 13, wherein:

said recording container is defined by arranging a hard substrate on a back side of the scan guiding plate member and coupling the hard substrate and the scan guiding plate member to form an integral body in a manner so as to secure a space for containing the code pattern recording medium therebetween, and said scan guiding plate member includes a first convexo/concave portion on a surface thereof for enabling at least one of a vertical and a horizontal direction of the two-dimensional code patterns to be tactilely detected.

15. The code pattern reading aid member according to claim 13, wherein each of said windows is provided with a second convexo/concave portion proximal thereto for enabling tactile determination of whether or not said window is linked to another one of said windows.

16. The code pattern reading aid member according to claim 13, wherein a length of each of said windows in a direction crossing a scanning direction of the reading apparatus is set substantially equal to a length of a distal end portion of the reading apparatus in the direction crossing the scanning direction of the reading apparatus.

17. The code pattern reading aid member according to claim 13, wherein said recording medium container is defined by two said scan guiding plate members which are coupled with a spacer of a predetermined thickness interposed therebetween.

18. A code pattern reading aid member comprising:

a recording medium container having an opening through which a code pattern recording medium is removably insertable, said code pattern recording medium comprising a code pattern recording face on which an optically readable two-dimensional code pattern representing at least one of audio data, video data and digital code data is printed;

a scan guiding plate member provided with a window having a shape corresponding to a shape of the two-dimensional code pattern, said window being formed at a position corresponding to a printed position of the two-dimensional code pattern when the code pattern recording medium is contained in said recording medium container, wherein said window serves as a guide for a reading apparatus for optically reading the two-dimensional code pattern by manually scanning the two-dimensional code pattern, wherein said recording medium container is defined by arranging a hard substrate on a back side of the scan guiding plate member and coupling the hard substrate and the scan guiding plate member to form an integral body in a manner so as to secure a space for containing the code pattern recording medium therebetween, and wherein said opening through which the code pattern recording medium is removably insertable is provided at a position corresponding to the space between the hard substrate and the scan guiding plate member.

19. The code pattern reading aid member according to claim 18, wherein said recording medium container is defined by two said scan guiding plate members which are arranged in a spaced apart manner from a top side and a back side of the hard substrate, respectively.

* * * * *

UNITED STATES PATENT AND TRADEMARK OFFICE
CERTIFICATE OF CORRECTION

PATENT NO. : 6,170,750 B1
DATED : January 9, 2001
INVENTOR(S) : Fuminori Ueno

It is certified that error appears in the above-identified patent and that said Letters Patent is hereby corrected as shown below:

<u>Title page,</u>
Item [56] References Cited, under "U.S. PATENT DOCUMENTS", insert
-- 4,521,678  6/1985  Winter  235/462.25

FOREIGN PATENTS DOCUMENTS

57-110655    12/1995    Japan
    0 670 555 A1  9/1995    European --.

Signed and Sealed this

Sixteenth Day of October, 2001

*Attest:*

NICHOLAS P. GODICI
*Attesting Officer*     *Acting Director of the United States Patent and Trademark Office*